United States Patent [19]

Hendrickson

[11] 4,340,558

[45] Jul. 20, 1982

[54] SCRIM REINFORCED PLASTIC FILM

[75] Inventor: Thomas C. Hendrickson, South River, N.J.

[73] Assignee: Colgate-Palmolive Company, New York, N.Y.

[21] Appl. No.: 101,234

[22] Filed: Dec. 7, 1979

Related U.S. Application Data

[62] Division of Ser. No. 683,555, May 5, 1976, abandoned.

[51] Int. Cl.$^3$ .............................................. B29C 17/00
[52] U.S. Cl. .................................. 264/151; 156/177;
156/178; 156/244.12; 156/244.19; 156/244.25;
156/251; 427/398.2; 428/255; 264/149;
264/174; 264/DIG. 81; 493/56; 493/190;
493/194
[58] Field of Search ............... 264/171, 174, DIG. 81,
264/103, 149, 151; 428/247, 255, 260; 93/33 H,
DIG. 1; 156/177, 178, 250, 251, 244.12, 244.19,
244.25; 427/398.2

[56] References Cited

U.S. PATENT DOCUMENTS

| | | | |
|---|---|---|---|
| 3,117,055 | 1/1964 | Guandique et al. | 264/174 |
| 3,222,237 | 12/1965 | McKelvy | 428/247 |
| 3,321,357 | 5/1967 | Kennedy | 156/178 |
| 3,331,725 | 7/1967 | Mercer | 264/174 |
| 3,411,181 | 11/1968 | Cawley | 264/174 |
| 3,444,025 | 5/1969 | Hillas | 264/174 |
| 3,649,405 | 3/1972 | Osborn | 156/244.12 |
| 3,713,875 | 1/1973 | Beyer et al. | 264/174 |
| 3,893,642 | 7/1975 | Vlaenderen | 156/244.12 |

Primary Examiner—James J. Bell
Attorney, Agent, or Firm—LeBlanc, Nolan, Shur & Nies

[57] ABSTRACT

Process for forming a scrim-reinforced film wherein a molten, film-forming plastic, such as polyethylene, in a high state of fluidity is fed onto an unsupported scrim and solidified by cooling to produce a scrim at least substantially completely enclosed and surrounded by the plastic. The film, thus produced, can be formed into a high strength bag container by a folding and cutting operation utilizing hot knife means capable of fusing and thus sealing the plastic. In a preferred embodiment, the plastic is extruded onto the scrim.

12 Claims, 5 Drawing Figures

U.S. Patent  Jul. 20, 1982  4,340,558
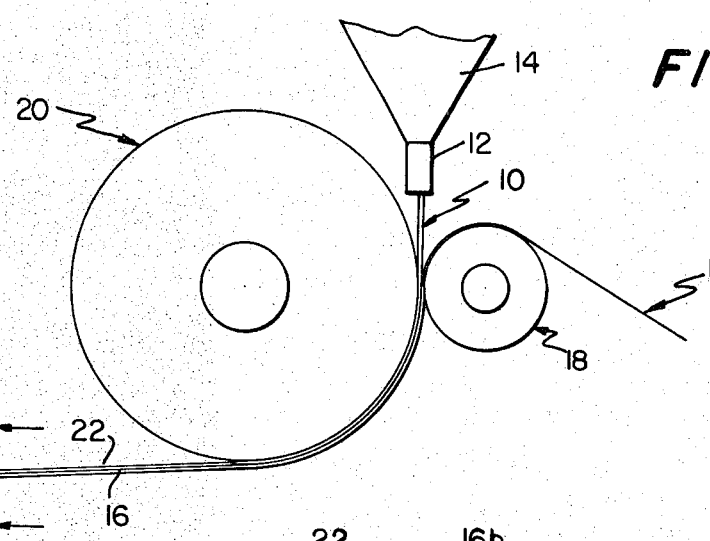
FIG. 1
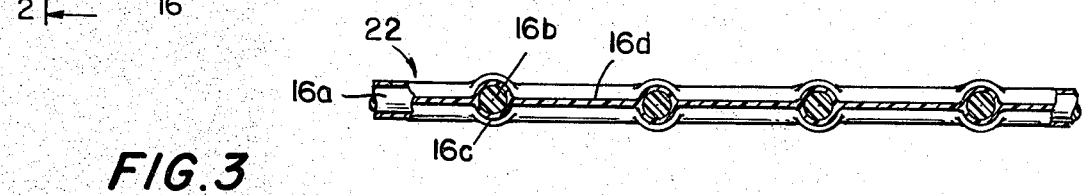
FIG. 2
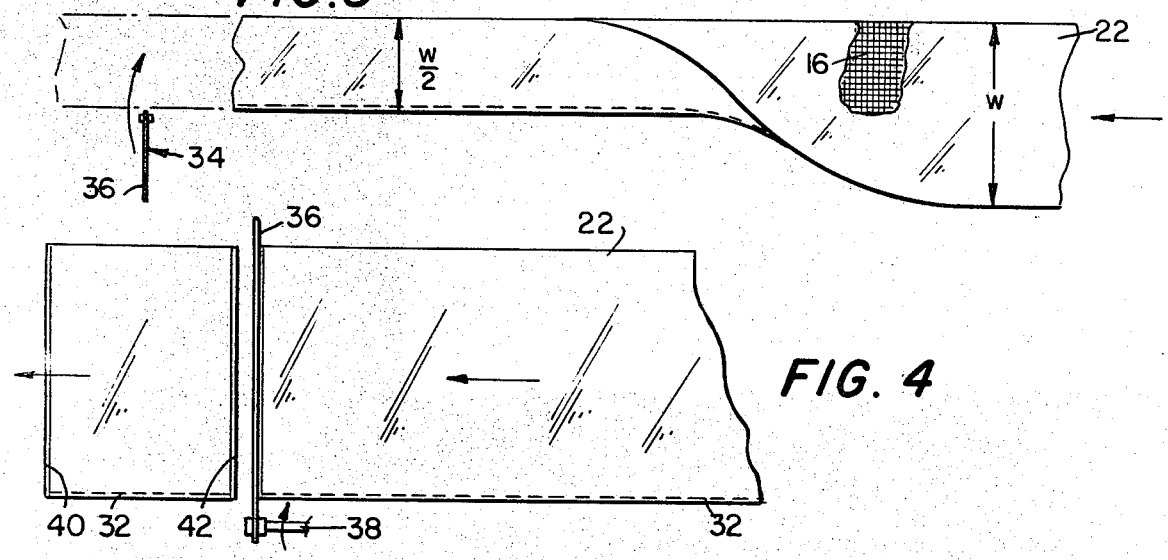
FIG. 3
FIG. 4
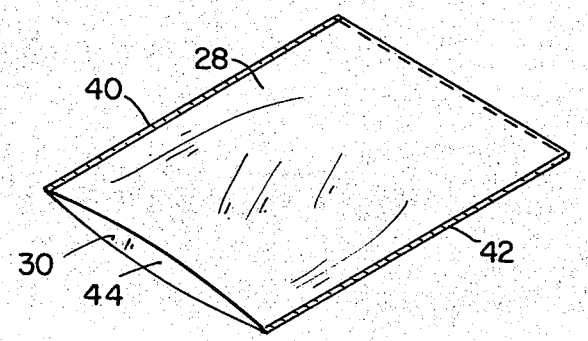
FIG. 5

SCRIM REINFORCED PLASTIC FILM

This is a division, of application Ser. No. 683,555, filed May 5, 1976 now abandoned.

BACKGROUND OF THE INVENTION

1. Field of the Invention

This invention relates to scrim-reinforced plastic film and a process for the preparation thereof and particularly to such film having improved strength properties, the film being advantageously adapted for use in preparing various types of containers, such as envelopes, bags etc.

2. Description of the Prior Art

Methods for the preparaton of scrim-reinforced plastic sheet are well known in the art. Since plastic materials currently available commercially lend themselves advantageously to a wide variety of uses and particularly in the packaging of consumer goods, there has been an ever-increasing emphasis on developing means to further enhance the strength properties of such materials. Thus, tensile strength, tear and impact resistance, moistureproofing and the like are especially important properties as regards container utility. The use of scrims, these usually comprising web material formed of spaced-apart strands of high strength thermoplastic resinous material, to reinforce plastic sheets has proved particularly effective in augmenting tensile strength, tear resistance and the like. One method commonly used for the preparation of scrim-reinforced plastic sheet involves sandwiching a scrim member between two sheets of thermoplastic material the assembly thereafter being heat bonded by various means, e.g., contacting opposed sides of the sandwich assembly with heated platens, radiant heating etc.

Thus, one such method involves the radiant heating of the edge portions of plastic material folded back on a scrim member to form an envelope portion. Other methods involve, for example, the application of adhesive to the scrim or web and/or the inner surfaces of the plastic sandwiching elements and pressure-sealing the elements together; extruding one or more layers of thermoplastic material onto a supported scrim or web i.e., provided with a thermoplastic backing layer.

Methods of the aforedescribed type entail significant disadvantages. Thus, the use of heated rollers invariably results in an undesirably thin enclosing plastic film; moreover, the combined heat-pressure effects often causes structural weakening of the film and particularly in the critical areas situated outside of the strands. Extrusion of plastic onto a supported web or scrim requires the use of a plastic backing or supporting sheet. Thus, there may be significant differences in the strength characteristics as between the opposed plastic members sandwiching the web. Bonding can occur between the outer plastic elements, or between each of these and the intermediate web which can produce sub-optimum strength characteristics in the product.

The foregoing methods require formation of a sandwich type element wherein the outer plastic layers are separately provided. This requires rather burdensome techniques for carrying out continuous operations. This aspect combined with the sub-optimum strength characteristics often obtained in the final product underscore the need for more effective methods for preparing reinforced plastic sheets.

Thus, a primary object of the invention is to provide a method for preparing reinforced plastic sheets wherein the foregoing and related disadvantages are eliminated or at least mitigated to a substantial extent.

Another object of the present invention is to provide such a method particularly advantageously adapted to continuous processing.

Yet another object of the invention is to provide such a method wherein any necessity for the use of heated pressure members such as platens to effect the bonding operation is eliminated.

Still another object of the invention is to provide such a method advantageously adapted to be carried out in conjunction with an extruder.

A further object of the invention is to provide such a method capable of producing a reinforced plastic sheet having improved strength properties including, tensile strength, tear resistance, impact resistance and the like.

A still further object of the invention is to provide such a method which can readily be integrated with a process for producing plastic containers such as envelopes, containers, etc.

Yet a still further object of the invention is to provide a reinforced plastic sheet material having significantly improved strength characteristics.

A still further object of the invention is to provide a scrim reinforced plastic sheet wherein the scrim reinforcement is apparent both visually and tactilely.

Other objects and advantages of the invention will become more apparent hereinafter as the description proceeds.

SUMMARY OF THE INVENTION

The foregoing objects are attained in accordance with the invention which in its broader aspects provide a process for preparing a scrim or web reinforced film comprising contacting molten plastic in a state of high fluidity with an unsupported scrim, said plastic flowing into and around the scrim network, cooling the plastic to solidify same to produce a scrim or web at least substantially completely enclosed and surrounded by said plastic.

In accordance with a preferred embodiment, the molten plastic comprises the extrudate from the discharge orifice of an extruder, this being fed to a contact zone to contact the unsupported scrim the distance between the discharge orifice of the extruder and the contact zone being such that the temperature of the molten extrudate as it contacts the scrim is at least about 400° F. and preferably at least about 600° F.

According to a preferred embodiment of the invention, the scrim method comprises two sets of synthetic plastic fibers or strands disposed to an angle to each other, preferably transversely. Each set of strands includes a plurality of uniformly spaced, parallel fibers. The strands can be from about 1 to about 20 mils thick in their largest cross sectional dimension, preferably from about 3 to about 8 mils. The fibers can be present in an amount of 1 to 5 fibers per inch per direction.

In accordance with a further specific aspect of the invention, the thickness of the scrim network at points of intersection of the strands is at least about 50 percent greater than the thickness of the strands. To provide the desired tactile sensation of reinforcement, according to this aspect of the invention, the thickness of the film measured between strands i.e. in the interstices formed by the strands is less than the scrim thickness at the intersection of the strands and at least half as great as that of the fibers.

The foregoing characteristics of the new reinforced material provides not only an actual and substantial increase in the strength of the material but also imparts the appearance and "feel" of strength to the product.

The invention is illustrated but not limited by reference to the accompanying drawing herein:

BRIEF DESCRIPTION OF THE DRAWINGS

FIG. 1 is a schematic view of an embodiment of the invention for producing a scrim-reinforced plastic sheet from a molten extrudate;

FIG. 2 is a sectional view taken along the line 2—2 in "FIG. 1".

FIG. 3 is a plan view, shown partly broken away illustrating the scrim-reinforced sheet folded longitudinally prior to the cutting operation for forming the container;

FIG. 4 is a plan view illustrating schematically the cutting operation for forming the product bag container;

FIG. 5 is a perspective view illustrating the product container.

DETAILED DESCRIPTION OF THE INVENTION

The invention is now described by reference to the accompanying drawing wherein like reference numerals designate similar parts throughout the views. "FIG. 1" illustrates an arrangement of apparatus for carrying out a preferred embodiment of the invention wherein a molten plastic extrudate 10 from the discharge orifice 12 of an extruder (illustrated partially) and generally designated 14 is directed onto a scrim or netting 16 carried by nip roll 18. Molten extrudate 10 contacts scrim 16 shortly prior to the latter entering the bite provided by chill roll 20 and nip roll 18, these members being positioned so as to tangentially engage opposed sides of the scrim and applied extrudate while the latter is in molten condition. It is essential in the practice of the present invention that the molten plastic extrudate, preferably a film-forming, thermoplastic, polymeric material to be described in greater detail hereinafter, be in a molten, highly fluid state when it contacts the scrim material. In general, the "contact" temperature of the molten plastic extrudate should be at least about 400° F. and preferably at least about 600° F. for optimum results and particularly for assuring a scrim-reinforced product wherein the scrim is completely enclosed and surrounded by the solidified plastic extrudate. The upper limiting contact temperature of the molten extrudate is not particularly critical apart from the requirement that it not exceed the decomposition point of the particular plastic material employed.

It is generally recommended that the speed of the nip roll be regulated to provide a linear scrim speed of from about 500 to 1,000 ft/min. as the scrim 16 passes between chill roll 20 and nip roll 18. Within the lower portion of the linear speed range stated, it is recommended that the temperature of the molten extrudate be maintained within the higher range and/or the distance between the discharge orifice 12 of extruder 10 and the point of contacting the molten extrudate with the scrim be decreased. Conversely, within the higher range of linear scrim speed, it is recommended that the molten extrudate temperature be maintained within the lower range and/or the distance between discharge orifice 12 and the scrim-molten extrudate contact point be increased. These factors can readily be determined in a particular instance having reference to the type of plastic material employed. Thus, operation within the aforestated parameters assures that the molten plastic extrudate in a relatively high state of fluidity flows into and around the scrim network i.e., the interstices defined by the strands comprising the scrim. This results in the scrim being completely enclosed and surrounded by the extrudate plastic subsequent to cooling and solidification thereof, this being illustrated, for example, in FIGS. "2" and "3". Scrim member 16, after contacting molten extrudate 10, is passed between the bite provided by chill roll 20 and nip roll 18 each tangentially engaging opposed sides of the scrim. The width of the bite can be adjusted to provide the desired thickness of the reinforced product 22.

The temperature of chill roll 20 should be such as to cause substantial solidification of the molten extrudate 10 whereby to render same substantially non-flowable as the scrim composite exits from the bite of chill roll 20 and nip roll 18. The temperature of chill roll 20 is related to the temperature of molten extrudate 10, the linear or coating speed of scrim 16 as well as the distance between the latter and the discharge orifice 12 of extruder 14. As the coating speed and/or molten extrudate temperature is increased, the chill roll temperature is preferably decreased. The scrim-reinforced assembly 22 is thereafter removed from chill roll 20 by any suitable pickup means (not shown) for further processing (optional) such as the container-forming operation to be described in more detail hereinafter.

Referring to FIG. "2", the scrim-reinforced plastic sheet 22 comprises a scrim member 16 that includes two angularly disposed sets of strands 16a and 16b. Each set includes a plurality of strands uniformly spaced to provide about 1 to 5 strands per lineal inch. Each strand 16a, 16b is from about 1 to about 20 mils thick, preferably from 3 to 8 mils. As shown in FIG. "2", the thickness of the scrim-film composite at the intersection of the strands, 16c is at least 50 percent greater than the thickness of the strands, to provide "Nubs" that are both visible and feelable. In combination with the increased "Nub" thickness, the thickness of the extruded film in the interstices between the strands and the thickness of the film covering the strands is at least ½ mil and is preferably from ½ the strand thickness to the strand thickness. The thickness of the film can be the same in the intertices 16d between strands and on the strands, or different within the foregoing limits.

The plastic material used in forming the molten extrudate 10 can be selected from a wide variety of materials well known in the art generally including preferably thermoplastic polymeric materials commonly used in the manufacture of plastic bag containers. Preferred for use herein are polyethylene and polypropylene materials capable of forming heat-sealable films. Other suitable materials include without necessary limitation polyvinyl chloride, copolymers of vinylidene chloride with vinyl chloride, polyacrylates, copolymers of styrene and acrylonitrile, cellulose triacetate, cellulose acetate butyrate, polyurethane elastomers, polystyrene, polyolefins including homo and interpolymers; generally, thermoplastic polymeric material capable of forming a continuous film on drying from a solvent solution thereof are useable herein.

Similarly, the material used in forming the scrim or netting 16 can be selected from a wide variety of substances well known in the art for such use and may be of any mesh design e.g., squares, circles, diamond, etc. Thus, the strands 16a/16b may be made from fibers of polyethylene, polypropylene, mixtures or blends of polyethylene and polypropylene, nylon and other polyamides, polyesters, polyacrylonitrile, vinyl chloride homo and co-polymers, polystyrene, polyvinylacetate, cellulose acetate and triacetate, viscose fibers and the like. The foregoing are exemplary of synthetic fibers useful herein; useful fibers of the natural type include, without limitation, cotton, wool, hogs hair, horse hair, vicuna and the like. Suitable materials available commercially include the plastic netting available under the trademark "Vexar" manufactured by E. I. du Pont de Nemours & Company which may be prepared from high density polyethylene, low density polyethylene, blends of high and low density polyethylene, polypropylene, copolymers of ethylene and propylene and blends of polyethylene. The fiber material may comprise twisted and/or untwisted mutifilamentary material, the range of twist ranging from about one-half to 20 turns or more per inch. The strands, as stated, may be of any desired mesh design such as the rectangular configuration illustrated in FIG. "3" and may be of the woven or non-woven type. Usually, there are provided from 1 to about 10 strands per inch with a range of from 3 to 4 strands per inch being particularly preferred. Although scrims of varying thickness and patterns may be used. It is, nevertheless, preferred that the scrim weight be from about 1 to 2 lbs./Mft$^2$.

In accordance with a particularly preferred embodiment in terms of cost and performance, the thermoplastic material comprising the molten extrudate is polyethylene while the scrim material comprise polypropylene, preferably of the oriented type as is well known in the art.

As explained, the process is preferably carried out utilizing an extruder for producing the molten form of the filmforming plastic material. However, it will be understood that other methods may be effectively employed for providing the requisite form of the molten plastic e.g., in the form of a molten extrudate. Moreover, other methods for forming the solidified, coated scrim assembly can be used such as an air knife coating technique utilizing cold air to effect cooling and solidification of the molten plastic. In any event, the essential criteria is the fluidity of the molten plastic at the time it contacts the scrim network. As explained previously, the extruding parameters should be chosen to effect at least substantial solidification of the molten plastic by the time it emerges from the bite of chilling roll 20 and nip roll 18. Thus, as the scrim speed and/or molten plastic temperature is increased, the temperature of the chilling roll should correspondingly be decreased consistent with the foregoing requirements.

The scrim-reinforced plastic sheet produced as described is particularly advantageously adapted to be formed into plastic bags of significantly improved strength. Thus, by virtue of contacting the molten plastic as described with an "unsupported" scrim, the quoted term connoting the absence any backing or support sheet whatsoever, there is obtained a sheet product having improved impact strength, tear and tensile strength. For example, when processed as described herein, it is found that the scrim imparts strength improvements of 33% in impact, doubled tear and quadrupled breaking strength. Plastic bag containers fabricated with the thus-reinforced plastic sheet material are accordingly capable of accommodating larger payloads, under higher stress conditions for longer periods of use. Moreover, since any requirement for a backing or support sheet is eliminated, the reinforced sheets are more economical to manufacture than the scrim-reinforced materials heretofore provided. One of the particularly surprising and unexpected advantages of the present invention in the fact that the product sheet material exhibits vastly improved strength properties despite the fact that a backing or support sheet is not used. In addition to reducing cost, this aspect enables the sheet forming processing to be simplified significantly leading to even greater savings.

The scrim-reinforced film composite 22 is collected by any suitable means, not shown, from chill roll 20 and folded longitudinally upon itself as illustrated in FIG. "3" into equal half sections. This can be accomplished, for example, by any conventional folding means as is well known in the art. In this manner, the film 22 of original width W (FIG. 3) is divided into sections 28 and 30 (FIG. 5) of width W/2 by means of longitudinal fold 32. The film 22 is transported in the direction indicated by arrow in FIG. "3" to a hot knife member generally designated 34 comprising a blade portion 36 rotatable about an axle portion 38 in in the direction indicated. The hot knife is maintained at a temperature which is sufficient to effect fusing i.e., heat bonding of Sections 28 and 30 along the cutting locii of the hot knife as illustrated at 40 and 42, FIG. "5". The rotary speed of blade 36 and the linear speed of film 22 in the direction indicated by arrow 34 are controlled so that cutting is effected at predetermined portions of film 22 to produce plastic bag containers such as illustrated in FIG. "5". Thus, heat sealed side portions 40 and 42 in combination with the bottom portion formed by longitudinal fold 32 provide a restraining portion 44 for accomodating various types of articles e.g., as part of a packaging operation, articles normally accumulated during shopping, or as a trash container, etc. The dimensions of the plastic bag container can be varied as desired by, for example, appropriately controlling the rotary speed of hot knife 34 and/or the linear speed of film 22. Although the aforedescribed method is preferred, it will be understood that other plastic container-forming methods can be used as are well known in the art.

What is claimed is:

1. Process for preparing a scrim-reinforced film composite comprising the steps of feeding hot molten synthetic non-metallic plastic material from a source in a state of high fluidity onto and into an unsupported scrim in the form of a sheet or web having a network of spaced strands, said plastic material being in a molten highly fluid state when it first contacts said scrim and being caused to flow into and around the scrim network under such conditions and in such manner that the molten plastic while still fluid flows over, between and around said strands whereby to completely cover and coat said strands on opposite sides and completely occupy the spaces between said strands, and then cooling said covered scrim to solidify the plastic material to produce a scrim-film composite wherein the scrim is completely enclosed by said plastic material.

2. Process according to claim 1 wherein said plastic material is discharged through the discharge orifice of an extruder directly onto said scrim while in fluid state.

3. Process according to claim 1 wherein the temperature of said molten plastic material is initially at least about 400° F. as it contacts the scrim.

4. Process according to claim 1 wherein the temperature of said molten plastic material is initially at least about 600° F. as it contacts the scrim.

5. Process according to claim 1 wherein said scrim-reinforced film is folded along a first direction and cut with hot knife means along a second direction substantially perpendicular to said first direction, the temperature of said hot knife means being sufficient to fuse said plastic on both sides of the cut whereby to produce a container open at its end opposite the fold.

6. Process according to claim 1 wherein said plastic material comprises thermoplastic, film forming polymer.

7. Process according to claim 6 wherein said polymer comprises polyethylene.

8. Process according to claim 6 wherein said scrim comprises a network of spaced apart strands of thermoplastic, film-forming polymer.

9. Process according to claim 8 wherein said plastic material comprises polyethylene and said scrim comprises oriented polypropylene.

10. Process according to claim 1 where in the plastic material is thermoplastic, the scrim strands are of synthetic plastic material, and the temperature of the molten thermoplastic at first contact with the scrim is about 400° F. to 600° F.

11. Process according to claim 1 wherein the molten plastic material is deposited on the scrim within the bite between two spaced rolls, said rolls being so relatively positioned and spaced as to substantially tangentially engage opposite sides of the composite being formed while the plastic material is still molten and thereby establish the thickness of said composite.

12. Process according to claim 11, wherein one of said rolls is a chill roll and the other is a nip roll spaced to define said bite.

* * * * *